United States Patent
Saito et al.

(10) Patent No.: US 11,266,925 B2
(45) Date of Patent: Mar. 8, 2022

(54) GAS PURIFYING APPARATUS, GAS PURIFYING METHOD AND CONVEYING HEATING APPARATUS

(71) Applicant: TAMURA CORPORATION, Nerima-ku (JP)

(72) Inventors: Shoichi Saito, Nerima-ku (JP); Hisashi Kimoto, Nerima-ku (JP); Nobuo Uchida, Nerima-ku (JP); Atsushi Shida, Nerima-ku (JP)

(73) Assignee: TAMURA CORPORATION, Nerima-ku (JP)

( * ) Notice: Subject to any disclaimer, the term of this patent is extended or adjusted under 35 U.S.C. 154(b) by 310 days.

(21) Appl. No.: 16/258,796

(22) Filed: Jan. 28, 2019

(65) Prior Publication Data

US 2019/0234342 A1    Aug. 1, 2019

(30) Foreign Application Priority Data

Jan. 29, 2018  (JP) .............................. JP2018-012609
Dec. 19, 2018  (JP) .............................. JP2018-237185

(51) Int. Cl.
*B01D 5/00*  (2006.01)
*B23K 1/00*  (2006.01)
(Continued)

(52) U.S. Cl.
CPC ........... *B01D 5/009* (2013.01); *B01D 53/002* (2013.01); *B23K 1/008* (2013.01); *B23K 1/0016* (2013.01);
(Continued)

(58) Field of Classification Search
CPC .. B01D 5/009; B01D 53/002; B01D 2258/06; B01D 50/00; B01D 5/0048;
(Continued)

(56) References Cited

U.S. PATENT DOCUMENTS 4,539,816 A    9/1985  Fox
5,281,245 A *  1/1994  Yang ..................... B01D 45/12
                                                    417/151
(Continued)

FOREIGN PATENT DOCUMENTS

CN    101111342 A       1/2008
CN    107398123 A *    11/2017 ............. B01D 45/16
(Continued)

OTHER PUBLICATIONS

JP2012033577A_ENG (Espacenet machine translation of Saito) (Year: 2012).*

(Continued)

*Primary Examiner* — Jonathan Miller
*Assistant Examiner* — Gabriel E Gitman
(74) *Attorney, Agent, or Firm* — Oblon, McClelland, Maier & Neustadt, L.L.P.

(57) ABSTRACT

A gas purifying apparatus has: a compressing unit for compressing a gas in which an atmosphere or inert gas and a substance vaporized by heating have been mixed; and an expanding unit for liquefying the substance by expanding the gas compressed by the compressing unit, wherein the gas in which the substance has been reduced is obtained.

5 Claims, 14 Drawing Sheets

(51) Int. Cl.
   *B23K 1/008* (2006.01)
   *B01D 53/00* (2006.01)
   *F02G 1/04* (2006.01)
   *F16D 31/02* (2006.01)
   *B03C 3/019* (2006.01)
   *F02G 3/00* (2006.01)

(52) U.S. Cl.
   CPC ............... *F02G 1/04* (2013.01); *F16D 31/02* (2013.01); *B01D 2258/06* (2013.01); *B03C 3/019* (2013.01); *F02G 3/00* (2013.01)

(58) Field of Classification Search
   CPC .... B01D 21/267; B23K 1/0016; B23K 1/008; F02G 1/04; F02G 3/00; F16D 31/02; B03C 3/019; B04C 3/02
   See application file for complete search history.

(56) References Cited

U.S. PATENT DOCUMENTS

| | | | | |
|---|---|---|---|---|
| 5,440,101 | A | * | 8/1995 | Cox ........................ B23K 1/008 219/388 |
| 6,120,585 | A | | 9/2000 | Inomata et al. |
| 2002/0178705 | A1 | * | 12/2002 | Mullins .................. B01D 46/02 55/385.2 |
| 2003/0136020 | A1 | * | 7/2003 | Miller, Jr. .............. B23K 1/008 34/429 |
| 2009/0282973 | A1 | | 11/2009 | Nakamura et al. |
| 2012/0272825 | A1 | * | 11/2012 | Brunnmair .............. B04C 5/081 95/271 |
| 2013/0255312 | A1 | * | 10/2013 | Elliott .................... B01D 45/08 62/640 |

FOREIGN PATENT DOCUMENTS

| | | | |
|---|---|---|---|
| CN | 107398123 A | 11/2017 | |
| FR | 2 926 227 A1 | 7/2009 | |
| GB | 26361 A A.D.1898 | 6/1899 | |
| GB | 2 085 310 A | 4/1982 | |
| JP | 9-307224 A | 11/1997 | |
| JP | 2007-281394 A | 10/2007 | |
| JP | 2008-294332 A | 12/2008 | |
| JP | 2012033577 A * | 2/2012 | ............ B23K 1/008 |
| JP | 2012-200661 A | 10/2012 | |
| KR | 10-1317367 B1 | 10/2013 | |
| WO | WO 2006/082959 A1 | 8/2006 | |

OTHER PUBLICATIONS

CN107398123A_ENG (Espacenet machine translation of Fu) (Year: 2017).*

Office Action dated Oct. 29, 2019 in Japanese Patent Application No. 2018-237185, 14 pages (with computer generated unedited English translation).

Extended European Search Report dated May 22, 2019 in European Patent Application No. 19154072.3, 8 pages.

Combined Chinese Office Action and Search Report dated Jun. 30, 2021 in Chinese Patent Application No. 201910083054.1 (with English translation), 17 pages.

* cited by examiner

GAS PURIFYING APPARATUS, GAS PURIFYING METHOD AND CONVEYING HEATING APPARATUS

CROSS-REFERENCE TO RELATED APPLICATIONS

The present application is based upon and claims the benefit of priority to Japanese Application No. 2018-012609, filed Jan. 29, 2018, and Japanese Application No. 2018-237185, filed Dec. 19, 2018. The entire contents of all of the above applications are herein incorporated by reference.

TECHNICAL FIELD

The present invention relates to a gas purifying apparatus, a gas purifying method, and a conveying heating apparatus which are applied to, for example, a reflowing apparatus.

BACKGROUND ART

Such a reflowing apparatus that solder compositions are preliminarily supplied to electronic parts or a printed wiring board and the board is conveyed into a reflow furnace by a carrying conveyer is used. In a heating zone of the reflowing apparatus, a solder in the solder compositions is melted by blowing a hot air to the board, so that an electrodes of the board and the electronic parts are soldered. The solder compositions contain a powdered solder, a solvent, and a flux. The flux contains rosin and the like as components and functions as a coating material in such a manner that an oxide film on a metal surface to be soldered is removed, such a situation that the metal is oxidized again by the heating at the time of soldering is prevented, a surface tension of the solder is reduced, and a wetting is improved.

The flux is liquefied by the heating and a part of it is further vaporized. Therefore, a gas (hereinbelow, properly referred to as a flux fume) in which an atmosphere or inert gas and a vaporized substance have been mixed is filled in a furnace as a heating chamber. The flux fume is liable to be adhered to a portion of a low temperature, is liquefied when it is cooled, and drops from the adhered portion. Therefore, there is also a case where the flux fume is adhered onto the upper surface of the board, so that performance of the board is deteriorated. There is also a case where a reflowing step is largely influenced by such a reason that the flux fume is deposited onto a portion where a temperature decreases in the furnace or the like. Therefore, the flux in the reflow furnace is reduced and eliminated.

According to a reflux reducing method in the related arts, a flux fume in a furnace as a heating chamber is guided to a flux collecting apparatus out of the furnace and the flux fume is cooled in the flux collecting apparatus, thereby liquefying flux components, collecting the flux, and returning a gas after the flux collection into the furnace. For example, in PTL (Patent Literature) 1, there is disclosed a technique for preventing such a situation that a flux fume is cooled and a pipe is choked by a solid material until the flux fume reaches a flux collecting apparatus from a reflow furnace. That is, the flux fume is guided to the flux collecting apparatus while maintaining the flux fume at a liquefaction temperature or higher.

In PTL 2, there is disclosed such a technique that a flux fume sent to a cooling unit is cooled by a cooling apparatus using a refrigerator, flux components are liquefied, and the flux components are adhered onto the surface of a frost and are removed. Further, in PTL 3, a construction for cooling a flux fume by an outside air circulating path having a double pipe structure is disclosed.

CITATION LIST

Patent Literature

PTL 1: WO2006/082959
PTL 2: JP 2007-281394 A
PTL 3: JP 2008-294332 A

SUMMARY OF INVENTION

Technical Problem

According to flux removing apparatuses disclosed in PTL 1, PTL 2, and PTL 3, since a collecting ability of the flux fume depends on a cooling ability, the flux collecting apparatus enlarges and in order to improve the cooling ability, equipment such as a chiller or the like is necessary, so that there are many problems such as increase in costs, increase in apparatus area, and the like.

It is, therefore, an object of the present invention to provide a gas purifying apparatus, a gas purifying method, and a conveying heating apparatus which do not cause such problems.

Solution to Problem

According to an aspect of the invention, there is provided a gas purifying apparatus comprising: a compressing unit configured to compress a gas in which an atmosphere or inert gas and a substance vaporized by heating have been mixed; and an expanding unit configured to liquefy the substance by expanding the gas compressed by the compressing unit, wherein the gas in which the substance has been reduced is obtained.

According to another aspect of the invention, there is provided a gas purifying method comprising the steps of: compressing a gas in which an atmosphere or inert gas and a substance vaporized by heating have been mixed; and liquefying the substance by expanding the compressed gas, wherein the gas in which the substance has been reduced is obtained.

According to still another aspect of the invention, there is provided a conveying heating apparatus which has a heating chamber for heating a heated object (that is, an object to be heated) and allows the heated object to pass in the heating chamber by a conveying apparatus, wherein:

a gas in which an atmosphere or inert gas and a substance vaporized by heating have been mixed is supplied to a gas purifying apparatus from the heating chamber; and the gas purifying apparatus comprises a compressing unit configured to compress the gas in which the atmosphere or inert gas and the substance vaporized by the heating have been mixed and an expanding unit configured to liquefy the substance by expanding the gas compressed by the compressing unit, and the gas in which the substance has been reduced is obtained.

Advantageous Effects of Invention

According to at least one of embodiments, the apparatus can be miniaturized as compared with the existing apparatus or method for liquefying the substance by cooling. The advantageous effects disclosed here are not always limited but may be any one of the effects disclosed in the invention. The contents of the invention should not be limitedly interpreted by the advantageous effects shown by examples in the following description.

DESCRIPTION OF EMBODIMENTS

Embodiments of the invention will be described hereinbelow. The explanation will be made in the following order.
<1. Principle of flux fume purification>
<2. Embodiment of the invention>
<3. Modifications>

The embodiments which will be described hereinbelow are exemplary specific examples of the invention and various kinds of limitations which are technically preferred are added. However, it is assumed that the scope of the invention is not limited to those embodiments unless otherwise described to limit the invention in the following explanation.

1. Principle of Flux Fume Purification

Figure 1:
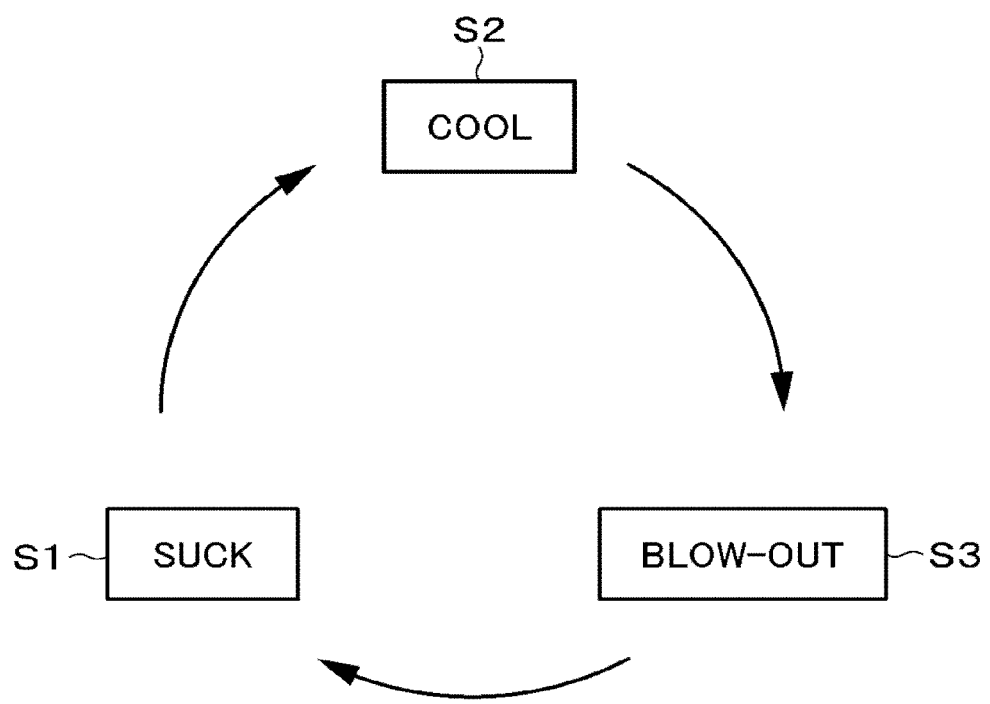
FIG. 1 is a state transition diagram for use in explanation of a gas purifying apparatus in the related arts.

In a flux fume purifying step in the related arts, as shown in FIG. 1, a flux fume is sucked from a reflowing apparatus (step S1) and, subsequently, the flux fume is cooled (step S2). Since the flux is a liquid or solid at an ordinary temperature, as illustrated in FIG. 2, flux molecules contained in the atmosphere gas are liquefied (or condensed) by cooling.

Figure 2:
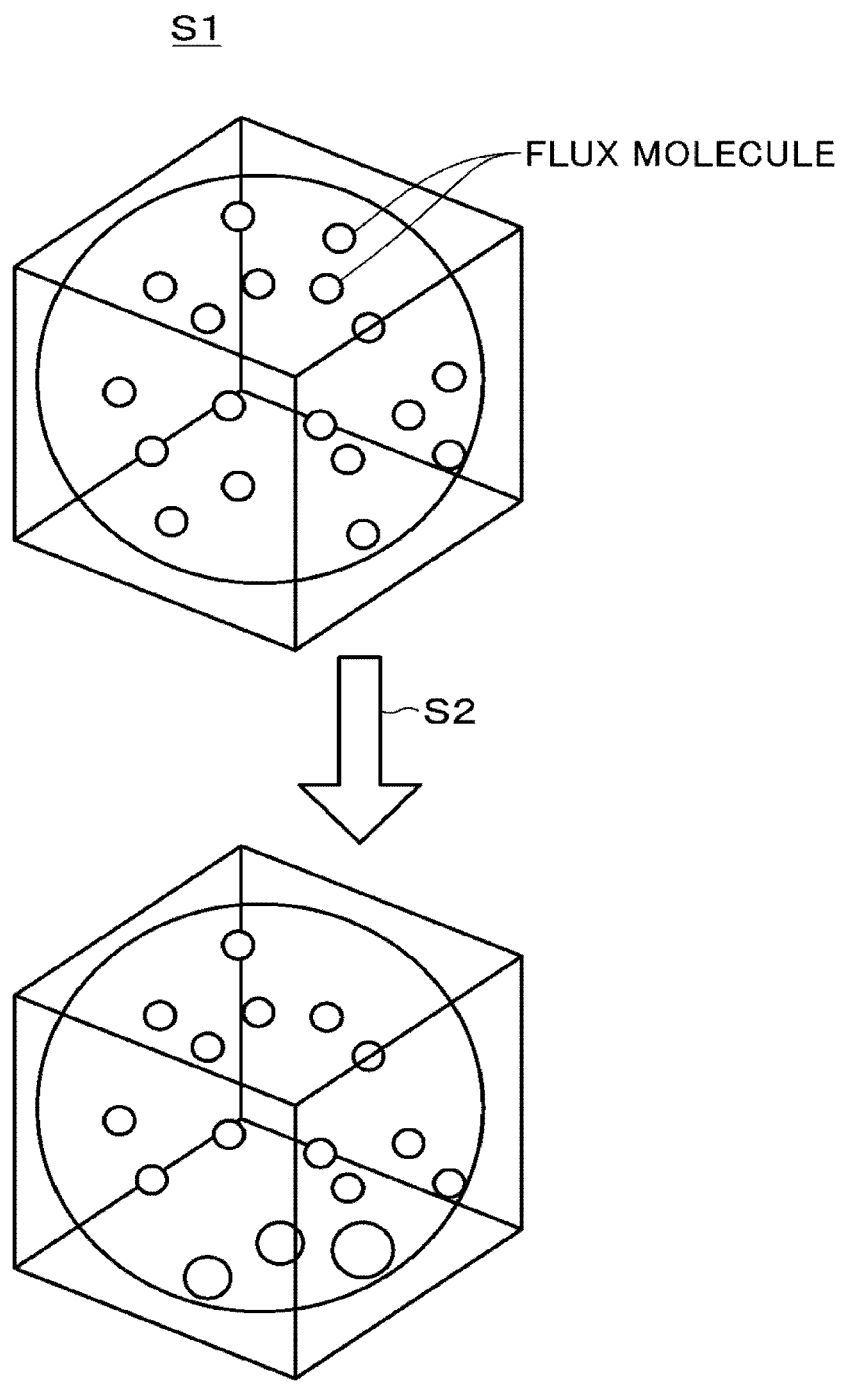
FIG. 2 is a schematic diagram for use in explanation of the gas purifying apparatus in the related arts.

FIG. 2 schematically illustrates flux molecules and a size of space where the flux molecules exist. The flux molecules are mutually coupled by liquefaction. The liquefied flux is collected by a collecting vessel or the like. The purified gas is blown out into a furnace (step S3). A series of steps of the section (step S1), cooling (step S2), and blow-out (step S3) of the flux fume is repeated. In the purifying step of the flux fume in the related arts, the compressing or expanding operation is not performed.

Figure 3:
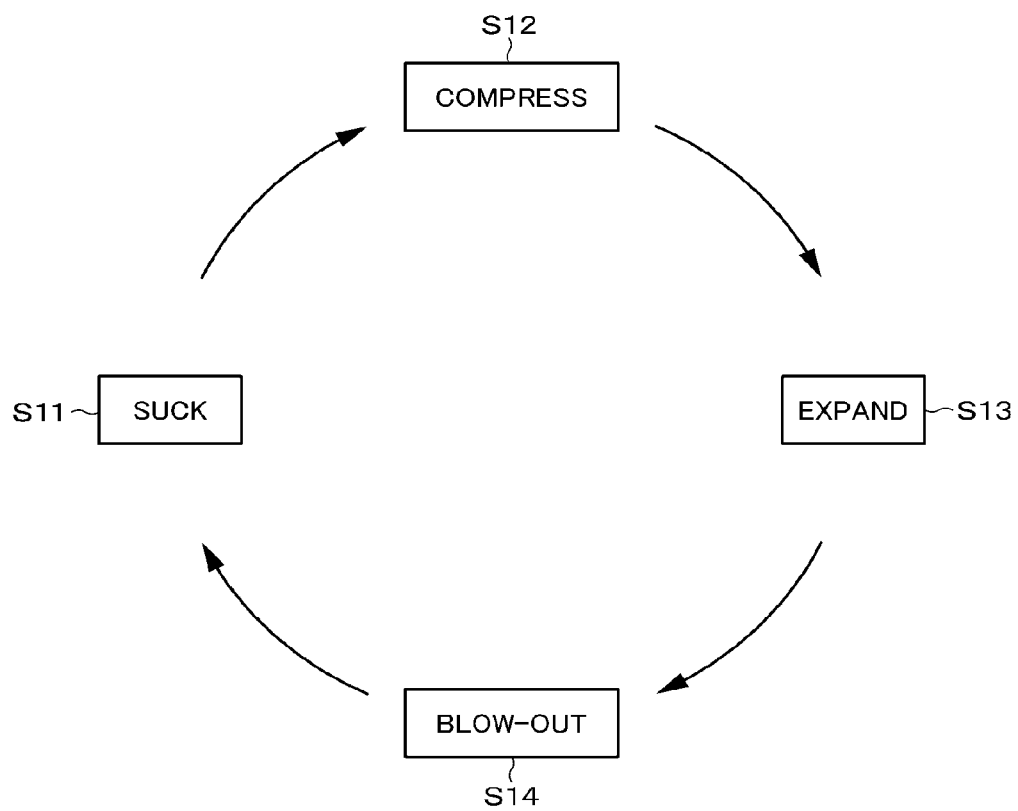
FIG. 3 is a state transition diagram for use in explanation of a gas purifying apparatus according to the invention.
Figure 4:
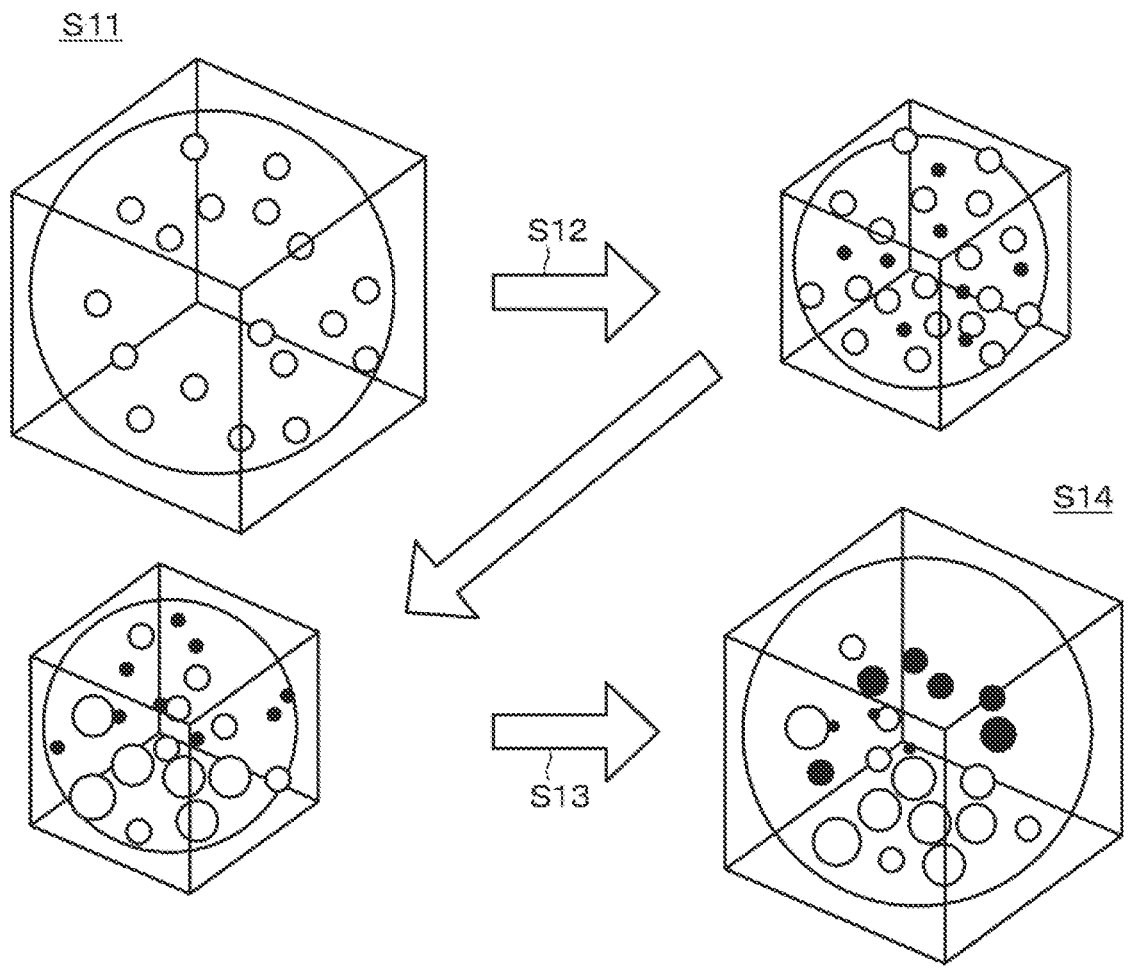
FIG. 4 is a schematic diagram for use in explanation of the gas purifying apparatus according to the invention.

The purification of the flux fume according to the invention will be described with reference to FIGS. 3 and 4. The flux fume is sucked from the reflow furnace (step S11) and, subsequently, the flux fume is compressed by pressurization (step S12). In FIG. 4, flux molecules which were newly liquefied by the compression are generated as shown by small black circles. Since the number of opportunity times of collision of the molecules increases due to the compression and the molecules are mutually coupled, a liquefaction occurs.

Subsequently, an expanding step (step S13) is performed. This expansion is preferably almost an adiabatic expansion. The term "adiabatic" denotes a state where there is no penetration and emission of heat. However, actually, since there may be small penetration and emission of heat, it is assumed that the expansion is almost an adiabatic expansion. A temperature of the flux fume decreases due to the adiabatic expansion and the flux is liquefied as a result of the cooling. The liquefied flux is collected by the collecting vessel or the like. The purified gas is blown out into the furnace (step S14). The circulation operation is applied from the suction (step S11) of the flux fume to the blow-out (step S14).

As mentioned above, in the invention, since a removing or collecting ability of the flux does not depend on a cooling ability, an increase in size of the flux fume purifying apparatus can be prevented. Equipment for improving the cooling ability can be made unnecessary. An increase in costs and an increase in apparatus area can be also prevented. In the invention, a combination of the cooling is not excluded. That is, in the invention, the gas purification is not performed only by the cooling.

2. Embodiment of the Invention

[Example of Reflowing Apparatus]

Figure 5:
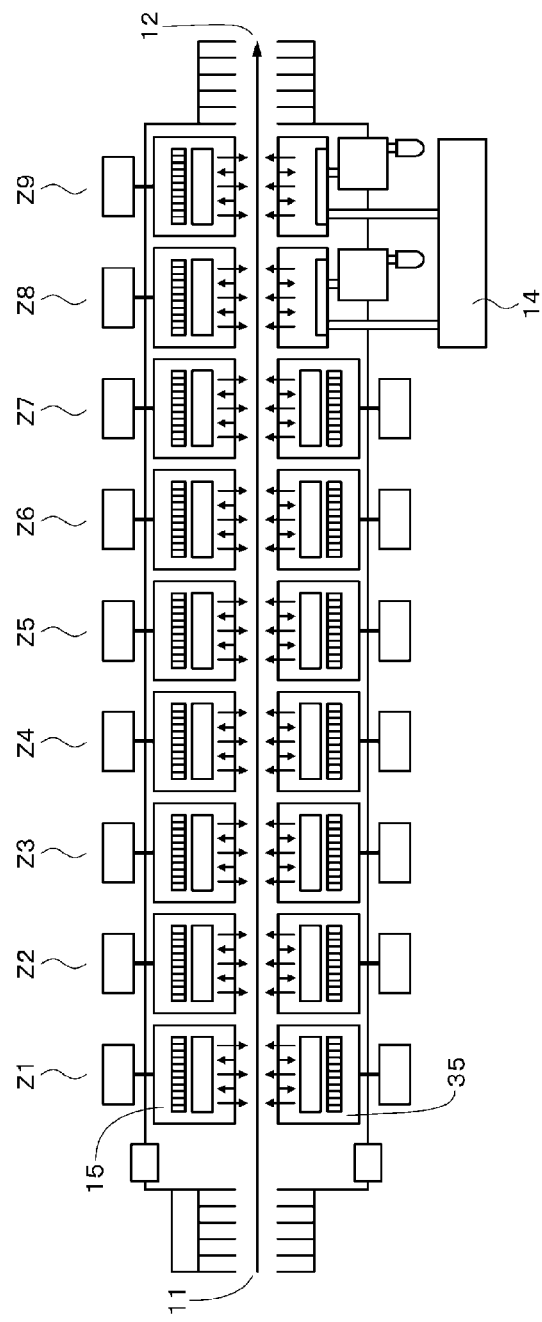
FIG. 5 is a schematic diagram illustrating an outline of a reflowing apparatus to which the invention can be applied.

FIG. 5 illustrates a schematic construction of a reflowing apparatus in the related arts to which the invention can be applied. A heated object (that is, an object to be heated) in which surface mounting electronic parts have been mounted on both surfaces of a printed wiring board is put onto a carrying conveyer and is conveyed into the furnace of the reflowing apparatus from an inlet port 11. The carrying conveyer conveys the heated object at a predetermined speed in an arrow direction (from the left to the right in FIG. 5) and the heated object is taken out of an exhaust port 12. It is assumed that the conveying direction of the carrying conveyer is the horizontal direction.

The reflow furnace is sequentially divided into, for example, nine zones Z1 to Z9 along a conveying path from the inlet port 11 to the exhaust port 12. Those zones Z1 to Z9 are arranged in an in-line shape. The seven zones Z1 to Z7 from the inlet side are heating zones. Two zones Z8 and Z9 on the exit side are cooling zones. A forced cooling unit 14 is provided in association with the cooling zones Z8 and Z9.

Figure 6:
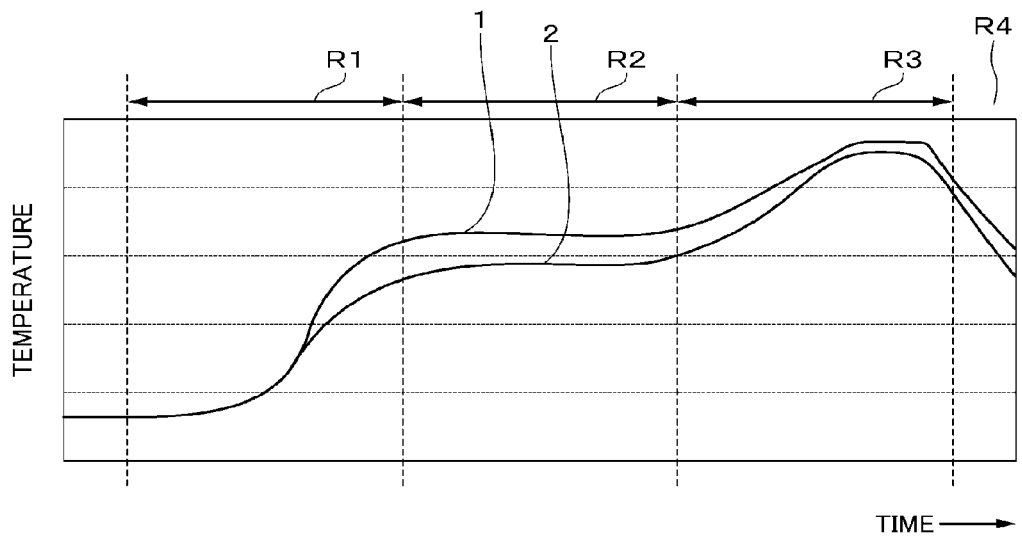
FIG. 6 is a graph showing examples of a temperature profile at the time of reflowing.

The foregoing plurality of zones Z1 to Z9 control the temperature of the heated object in accordance with a temperature profile at the time of reflowing. FIG. 6 shows an outline of examples of the temperature profile. An axis of abscissa indicates a time and an axis of ordinate indicates a surface temperature of the heated object, for example, the printed wiring board on which the electronic parts have been mounted. The first interval corresponds to a temperature elevating portion R1 in which the temperature rises by heating. The next interval corresponds to a preheating portion R2 in which the temperature is almost constant. The further next interval corresponds to a main heating portion R3. The last interval corresponds to a cooling portion R4.

The temperature elevating portion R1 is an interval in which the board is heated from the ordinary temperature to the preheating portion R2 (for example, 150° C. to 170° C.). The preheating portion R2 is an interval for performing an isothermal heating, activating the flux, removing oxide films on the surfaces of the electrodes and solder powder, and eliminating a heating variation of the printed wiring board. The main heating portion R3 (for example, peak temperature of 220° C. to 240° C.) is an interval in which the solder is melted and a junction is completed. In the main heating portion R3, it is necessary to raise the temperature up to a temperature exceeding a melting temperature of the solder. In the main heating portion R3, even after the preheating portion R2 elapsed, since a variation of the temperature elevation exists, it is necessary to heat the solder up to a temperature exceeding the melting temperature of the solder. The last cooling portion R4 is an interval for rapidly cooling the printed wiring board and forming solder compositions.

In FIG. 6, a curve 1 indicates an example of a temperature profile of a lead-free solder. In the case of an Sn—Pb eutectic solder, a temperature profile is as shown by a curve 2. Since a melting point of the lead-free solder is higher than that of the eutectic solder, it is assumed that setting temperatures in the preheating portion R2 and the main heating portion R3 are set to be higher than those of the eutectic solder.

In the reflowing apparatus, temperature control of the temperature elevating portion R1 in FIG. 6 is made mainly by the zones Z1 and Z2. Temperature control of the preheating portion R2 is made mainly by the zones Z3, Z4, and Z5. Temperature control of the main heating portion R3 is made by the zones Z6 and Z7. Temperature control of the cooling portion R4 is made by the zones Z8 and Z9.

Figure 7:
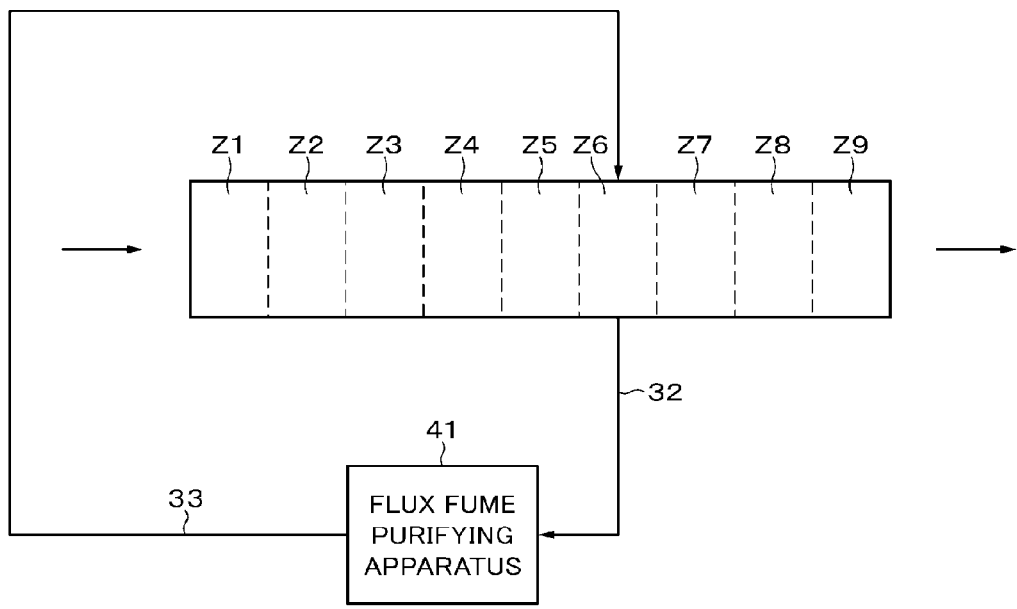
FIG. 7 is a schematic diagram illustrating a whole construction of an embodiment of the invention.

In the embodiment of the invention, as shown in FIG. 7, the flux fume in the furnace is extracted from, for example, the zone Z6 and the extracted flux fume is supplied to a flux fume purifying apparatus 41 through a piping 32. In the flux fume purifying apparatus 41, the flux fume is purified as will be described hereinafter. The gas after the purification is fed to the zone Z6 through a piping 33. The flux fume may be extracted from a zone other than the zone Z6. The purified gas may be returned to a zone other than the zone Z6. Further, the flux fume may be extracted from a plurality of zones instead of one zone and the gas may be returned to a plurality of zones.

Figure 8:
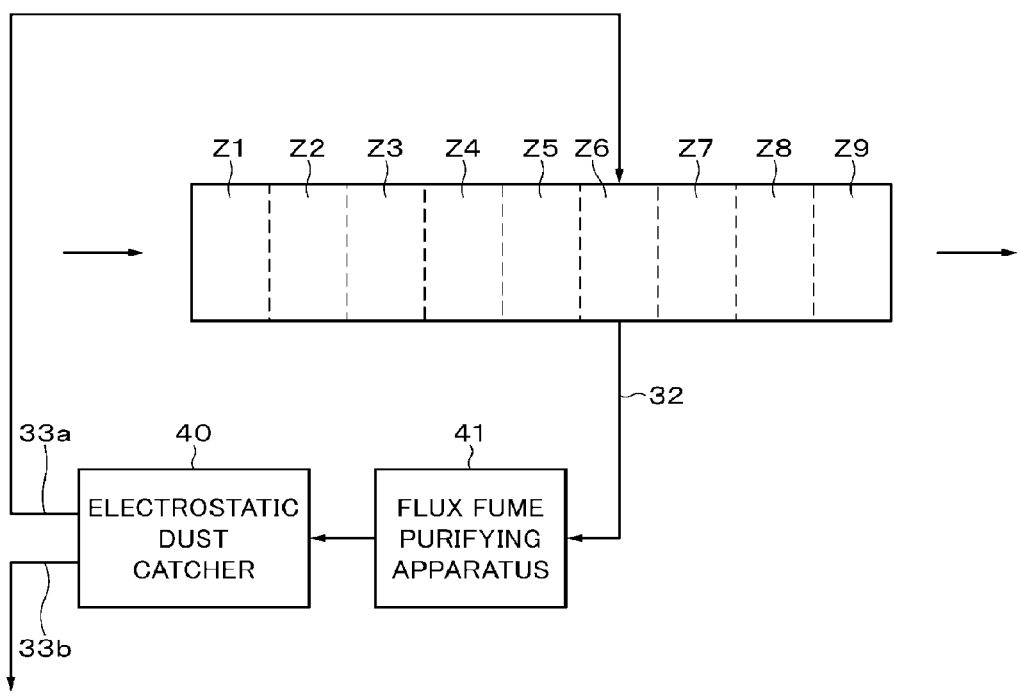
FIG. 8 is a schematic diagram illustrating a whole construction of the embodiment of the invention.

Further, as shown in FIG. 8, it is also possible to construct in such a manner that the gas after the purification which was purified by the flux fume purifying apparatus 41 is supplied to an electrostatic dust catcher 40, the gas purified by the electrostatic dust catcher 40 is fed to the zone Z6 through a piping 33a, and the purified gas is emitted as a factory exhaust gas through a piping 33b. The electrostatic dust catcher 40 has, for example, a charging unit and a dust catching unit and is constructed in such a manner that contaminated particles which were charged to + (positive) or − (negative) by the charging unit are caught to a − (negative) or + (positive) electrode plate of the dust catching unit. The state where the gas is returned to the zone Z6 and the state where the gas is emitted as a factory exhaust gas may be switched. The caught particles are condensed and liquefied. According to the electrostatic dust catcher 40, since fine particles of 1 μm or less can be removed, the gas can be emitted as a factory exhaust gas.

Figure 9:
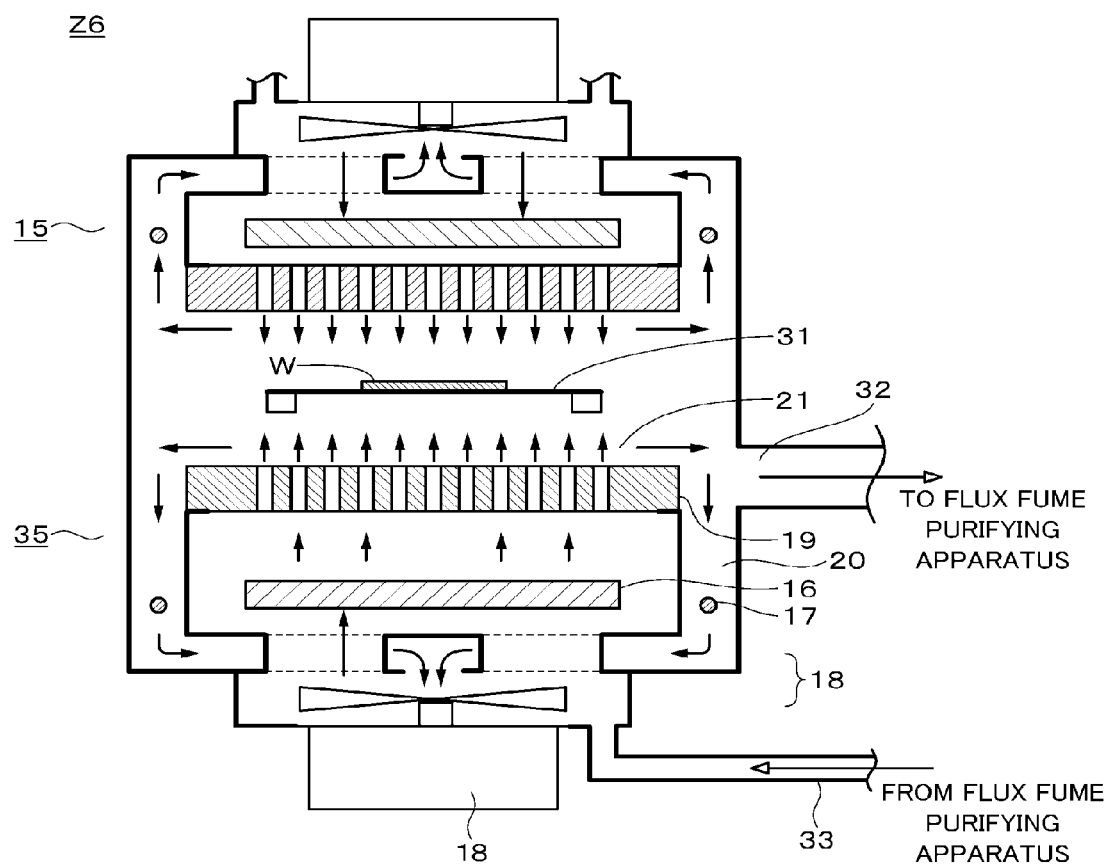
FIG. 9 is a cross sectional view illustrating an example of a construction of one heating zone of the reflowing apparatus.

An example of a furnace as a heating apparatus will be described with reference to FIG. 9. For example, a construction of the zone Z6 is illustrated in FIG. 9. In an opposed gap between an upper furnace 15 and a lower furnace 35, a heated object (that is, an object to be heated) W in which surface mounting electronic parts have been mounted on both surfaces of the printed wiring board is put onto a carrying conveyer 31 and is conveyed. For example, a nitrogen ($N_2$) gas as an atmosphere gas is filled in the upper furnace 15 and the lower furnace 35. The upper furnace 15 and the lower furnace 35 emit a hot air (heated atmosphere gas) to the heated object W and heat the heated object W. Infrared rays may be also irradiated together with the hot air.

The lower furnace 35 is constructed by a main heating source 16, a sub-heating source 17, an air blower, for example, an axial blower 18, a heat accumulating member 19, a hot air circulating duct 20, an opening portion 21, and the like. Since the upper furnace 15 is constructed, for example, in a manner almost similar to the foregoing lower furnace 35, a description of the corresponding portions is omitted. As a blower, a centrifugal fan such as turbo fan, scirocco fan, or the like may be used. Further, the construction of the furnace illustrated in FIG. 9 is an example and may be another construction.

The hot air is blown to the heated object W through the opening portion 21. The main heating source 16 and the sub-heating source 17 are constructed by, for example, electric heaters. The heat accumulating member 19 is made of, for example, aluminum. A number of holes are formed in the heat accumulating member 19 and the hot air passes through the holes and are blown to the heated object W.

The hot air is circulated by the axial blower 18. That is, the hot air is circulated through a path of (main heating source 16→heat accumulating member 19→opening portion 21→heated object W→hot air circulating duct 20→sub-heating source 17→hot air circulating duct 20→axial blower 18→main heating source 16).

The piping 33 for introducing the gas after the purification from the flux fume purifying apparatus 41 is provided near the axial blower 18 with respect to the atmosphere gas in the reflow furnace. The gas after the purification is fed into the furnace through the piping 33. In the flux fume purifying apparatus 41, the flux in the flux fume is removed and collected and the gas after the purification in which the flux has been reduced or removed is produced.

[Flux Fume Purifying Apparatus]

Figure 10:
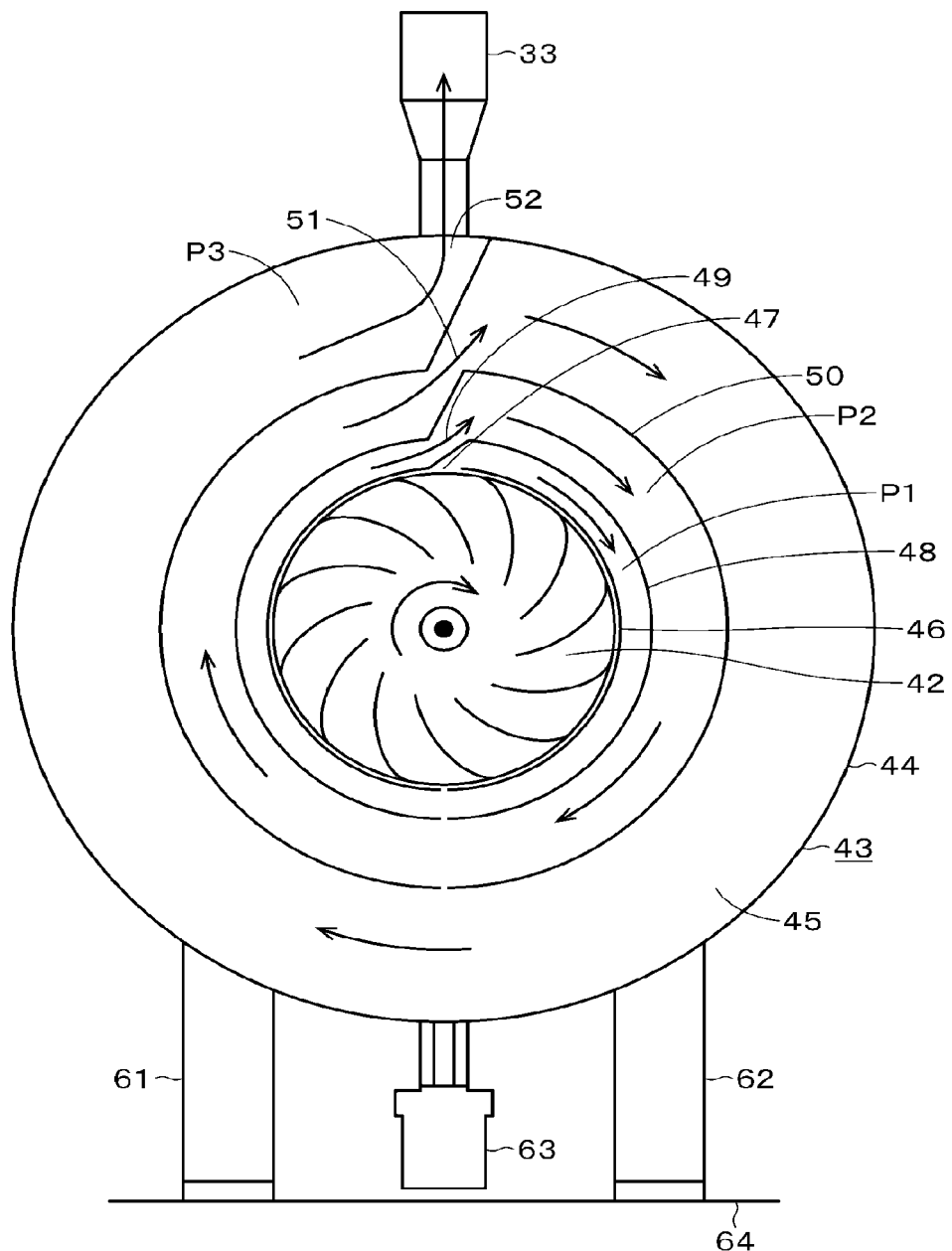
FIG. 10 is a front view illustrating an internal structure of the embodiment of the invention.

An example of the flux fume purifying apparatus 41 will be described with reference to FIG. 10. The flux fume purifying apparatus 41 is constructed by an air blower, for example, a turbo fan, a path forming unit provided in a blow-out portion of the turbo fan, and a flux collecting vessel. Support legs 61 and 62 are provided under the flux fume purifying apparatus 41. The flux fume purifying apparatus 41 is attached to a floor 64. The flux accumulated in a lower portion of the flux fume purifying apparatus 41 is collected by a flux collecting vessel 63.

Blades 42 of the turbo fan of the flux fume purifying apparatus 41 are rotated in the direction shown by an arrow by a motor (not shown) and the flux fume is blown out from the outer peripheral side surfaces of the blades 42. The blown-out flux fume is fed into a path forming unit 43. For example, the motor is arranged on the back side of paper of the drawing and the flux fume is sucked from the front side of the paper. FIG. 10 illustrates a state where a circular cover which covers the path forming unit 43 has been detached.

The path forming unit 43 has a path (passage of the wind) which is concentric or spiral with respect to the outer peripheral side surfaces of the blades 42. The path forming unit 43 forms a path for purifying the flux fume which was blown out in the centrifugal direction by the turbo fan and returning the gas after the purification to the space in the furnace, for example, the zone Z6 of the reflowing apparatus through the upper piping 33. The liquefied flux is collected by the lower flux collecting vessel 63.

The path forming unit 43 has a circular bottom plate 45 in which the blades 42 have been attached to its center, an outer peripheral plate 44 is provided along the outer circumference of the bottom plate 45, and a plurality of paths are formed on the bottom plate 45. Further, the upper portions of the plurality of paths are covered by the cover (not shown) and a closed space including the plurality of paths is formed. The path forming unit 43 is formed by processing a metal such as aluminum, stainless steel, or the like.

A partition plate 46 is wound around almost one round of the outer peripheral side surface of the blades 42 of the turbo fan to which the wind is blown out. A gap formed in a part of the partition plate 46 is used as a supply opening 47. The partition plate 46 is a band-like thin metal plate attached almost perpendicularly to the bottom plate 45.

The supply opening 47 is used as an inflow port. A first path P1 is formed by the partition plate 46 and a partition plate 48 which were concentrically arranged. The partition plates 46 and 48 are continuous. The partition plate 48 is away from the partition plate 46 at a position of the supply opening 47 and is concentrically arranged with respect to the partition plate 46. An opposed interval between the partition plates 46 and 48 is set to a predetermined value and an opposed space is used as a path P1. As shown by arrows, the flux fume which was blown out of the supply opening 47 passes through the first path P1 and is guided to an exhaust port 49 formed at a position near an edge portion of the partition plate 48.

From the exhaust port 49 of the first path P1 formed around almost one round by the partition plates 46 and 48, the flux fume flows into a second path P2 formed by the partition plate 48 and a partition plate 50. The partition plate 50 is continuous to the partition plate 48, is away from the partition plate 48 at a position of the exhaust port 49, and is concentrically arranged with respect to the partition plate 48. An opposed interval between the partition plates 48 and 50 is set to a predetermined value and an opposed space is used as a path P2. As shown by arrows, the flux fume is fed into the path P2 from the exhaust port 49. As shown by arrows, the flux fume passes through the second path P2 and is guided to an exhaust port 51 formed at a position near an edge portion of the partition plate 50.

An opposed distance between the partition plates 48 and 50 is set to be larger than that between the partition plates 46 and 48. Since heights of the partition plates 46, 48, and 50 are equal (opposed distance between the bottom plate 45 and the cover), a cross sectional area of the second path P2 is larger than that of the first path P1. Thus, the flux fume is compressed in the first path P1 and the flux fume is adiabatic-expanded in the exhaust port 49 where the path is switched from the first path P1 to the second path P2. The adiabatic expansion denotes such an expansion in an almost adiabatic state as mentioned above. Therefore, the first path P1 functions as a compressing unit and the second path P2 functions as an expanding unit.

A third path P3 using the exhaust port 51 as an inflow port is formed by the partition plate 50 and the outer peripheral plate 44. The partition plate 50 is away from the partition plate 50 at a position of the exhaust port 51 and its distal end is joined with the inner surface of the outer peripheral plate 44. An opposed interval between the partition plate 50 and the outer peripheral plate 44 is set to a predetermined value and an opposed space is used as a third path P3. As shown by arrows, the flux fume supplied from the second path P2 passes through the third path P3 and is guided to an exhaust port 52 to which the piping 33 has been connected. The gas after the purification is fed into the furnace through the piping 33.

An opposed distance between the partition plate 50 and the outer peripheral plate 44 is set to be larger than that between the partition plates 48 and 50. Since heights of the partition plates 48 and 50 and the outer peripheral plate 44 are equal (opposed distance between the bottom plate 45 and the cover), a cross sectional area of the third path P3 is larger than that of the second path P2. Thus, the flux fume is compressed in the second path P2 and the flux fume is adiabatic-expanded in the exhaust port 51 where the path is switched from the second path P2 to the third path P3. Therefore, the second path P2 functions as a compressing unit and the third path P3 functions as an expanding unit. That is, the first path P1, the second path P2, and the third path P3 are continuously formed and the second path P2 performs both functions of the compressing unit and the expanding unit.

A correspondence relation between the flux fume purifying step of the invention described with reference to FIG. 3 and the process of the flux fume purifying apparatus 41 in the embodiment of the invention is as follows.

Step S11 (suck): The flux fume blown out of the supply opening 47 flows into the path P1.

Step S12 (compress): Since the cross sectional area of the path P1 is small, the flux fume is compressed. The number of collision times of the flux molecules in the path P1 increases and a part of the flux molecules are liquefied.

Step S13 (expand): The flux fume is blown out from the exhaust port 49 into the path P2. Since the cross sectional area of the path P2 is larger than that of the path P1, the flux fume is adiabatic-expanded. Thus, a temperature in the path P2 decreases and the liquefaction of the flux molecules further progresses.

The following processes are further executed in the flux fume purifying apparatus 41.

Step S13' (' denotes the expanding process of the second time): The flux fume is blown out from the exhaust port 51 into the path P3. Since the cross sectional area of the path P3 is larger than that of the path P2, the flux fume is adiabatic-expanded when the path is switched from the path P2 to the path P3. Thus, a temperature in the path P3 decreases and the liquefaction of the flux molecules further progresses.

Step S14 (blow-out): The flux fume which passed through the path P3 and was purified is returned from the exhaust port 52 to the furnace (for example, zone Z6) through the piping 33.

In the embodiment of the invention, since the processes of (compression (path P1)→adiabatic expansion (path P2)) and (compression (path P2)→adiabatic expansion (path P3)) are executed, a collecting ability of the flux can be enhanced.

Modification 1

Figure 11:
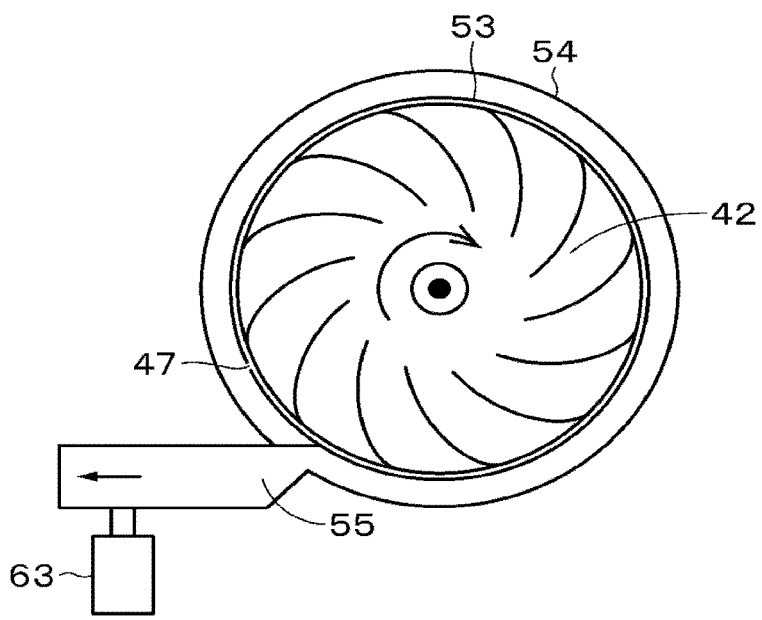
FIG. 11 is a schematic diagram for use in explanation of a first modification of the invention.

FIG. 11 illustrates an example of a construction in which the compression and the adiabatic expansion of the flux fume are performed once. A partition plate 53 which covers the outer peripheral side surfaces of the blades 42 of the turbo fan excluding the supply opening 47 is provided. A partition plate 54 which faces the partition plate 53 is provided. An opposed interval between the partition plates 53 and 54 is increased at a supply opening 55. According to such a path, since the compressing unit and the expanding unit are continuously provided, the steps of (compression→adiabatic expansion→blow-out) can be performed.

Modification 2

Figure 12:
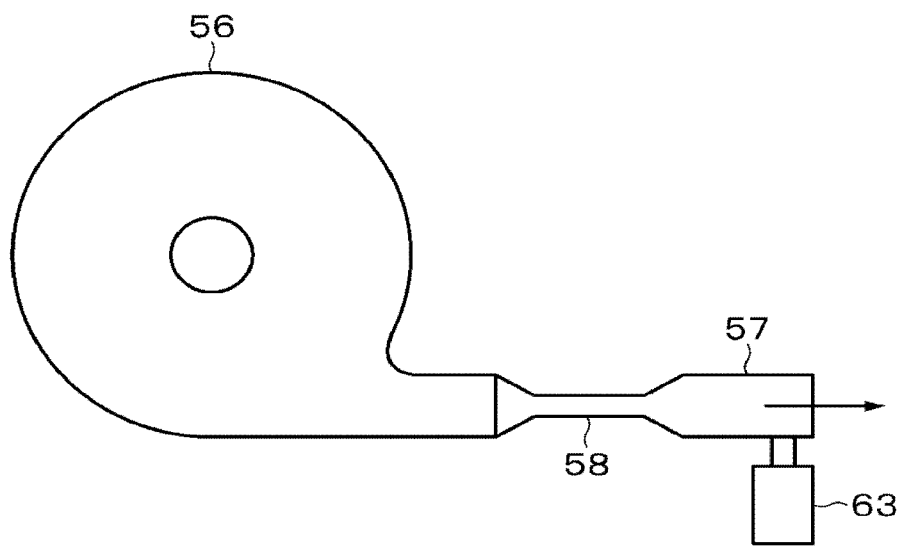
FIG. 12 is a schematic diagram for use in explanation of a second modification of the invention.

As illustrated in FIG. 12, a piping 57 having a necking 58 may be connected to a supply opening of an existing turbo fan 56. The flux fume is compressed by the necking 58. When the flux fume passes through the necking 58 and enters a wide path, the adiabatic expansion is performed. Although FIG. 12 shows an example in which there is one necking, it is also possible to construct in such a manner that the piping has a plurality of neckings through which the flux fume sequentially passes.

Modification 3

Figure 13:
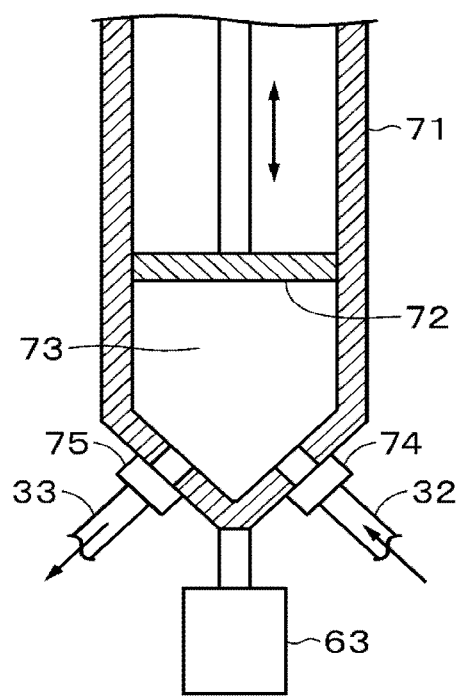
FIG. 13 is a schematic diagram for use in explanation of a third modification of the invention.

In the foregoing explanation, the turbo fan is used as an apparatus for sucking the flux fume and blowing out. However, a construction other than the turbo fan can be also used. As illustrated in FIG. 13, a piston 72 moves vertically in a cylinder 71 and a volume of a space 73 in the cylinder 71 fluctuates. An inlet valve 74 is attached to the space 73 and a suction of the flux fume which is supplied through the piping 32 is controlled. An exhaust valve 75 is also attached and an exhaustion of the gas after the purification which is exhausted through the piping 33 is controlled. The collecting vessel 63 for collecting the flux accumulated on the bottom of the cylinder 71 is provided.

The operation of the construction illustrated in FIG. 13 is shown in the following Table 1.

TABLE 1

| Step | 1 | 2 | 3 | 4 |
| --- | --- | --- | --- | --- |
| Inlet valve | Open | Close | Close | Close |
| Exhaust valve | Close | Close | Close | Open |
| Piston | Rise | Fall | Rise | Fall |
| Operation | Suck | Compress | Expand | Exhaust |

As shown in Table 1, the following steps are sequentially executed.

Step 1: The inlet valve 74 is opened and the exhaust valve 75 is closed. The piston 72 rises and the flux fume is inhaled into the space 73.

Step 2: The inlet valve 74 is closed and the exhaust valve 75 is closed. The piston 72 falls and the flux fume in the space 73 is compressed. The number of opportunity times of collision of the flux molecules increases due to the decrease in volume of the space 73 and a part of them are liquefied.

Step 3: The inlet valve 74 is closed and the exhaust valve 75 is closed. The piston 72 rises and the flux fume is expanded (preferably, adiabatic expansion) in the space 73. A temperature in the space 73 decreases due to the expansion and the flux molecules are liquefied. The liquefied flux molecules are accumulated on the bottom of the cylinder 71.

Step 4: The inlet valve 74 is closed and the exhaust valve 75 is opened. The piston 72 falls and the gas after the purification in the space 73 is exhausted.

Modification 4

Figure 14:
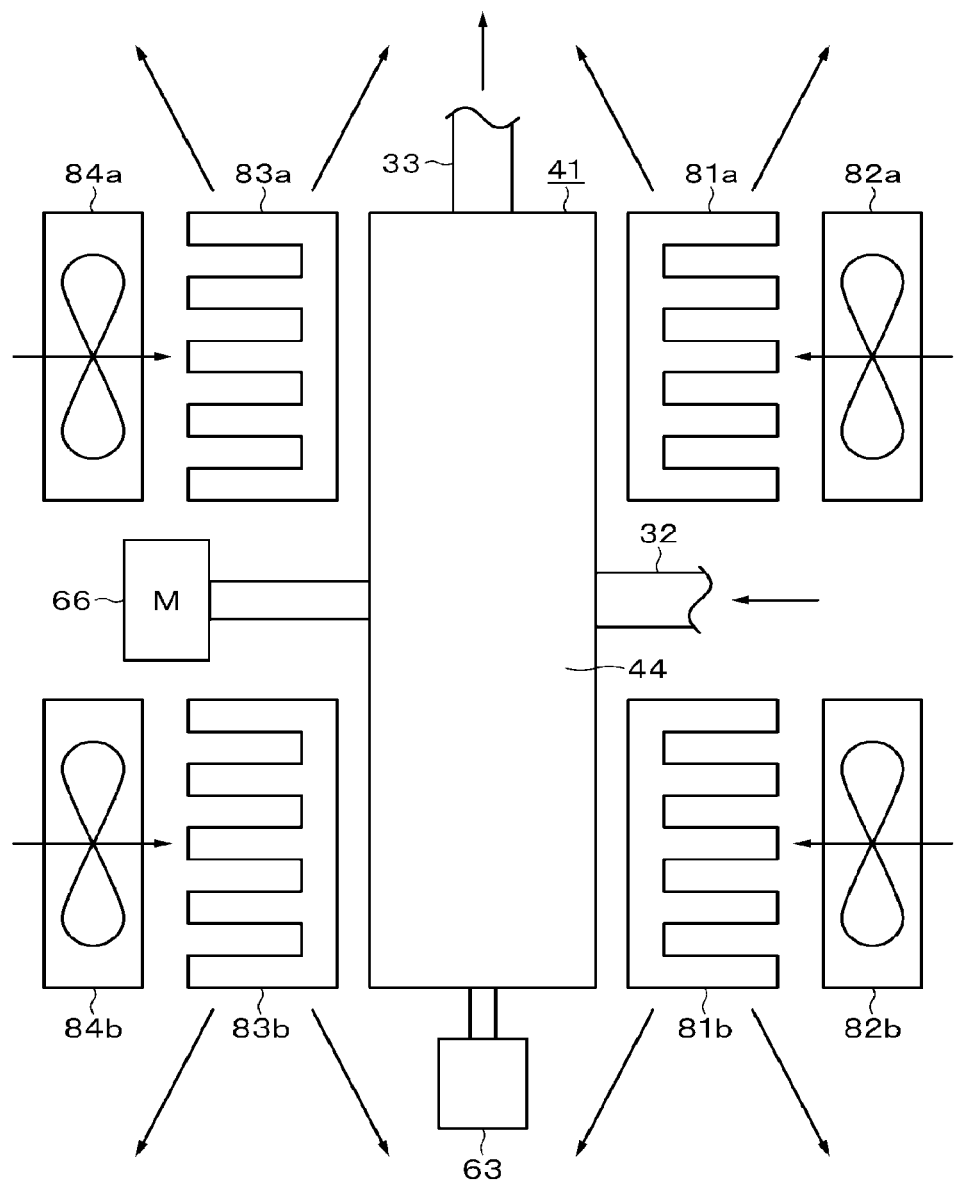
FIG. 14 is a schematic diagram for use in explanation of a fourth modification of the invention.

In the invention, if the technique for liquefying the flux in the flux fume by the cooling is combined, it is effective. As illustrated in FIG. 14, a cooling apparatus is added to the flux fume purifying apparatus 41 shown in FIG. 10. A motor 66 is provided to rotate the blades 42 of the turbo fan.

Radiating blocks 81*a* and 81*b* are arranged to the bottom plate of the flux fume purifying apparatus 41 so as to be in contact therewith or in close vicinity thereto. It is desirable that the radiating blocks 81*a* and 81*b* cover the surface area of the bottom plate as much as possible. Each of the radiating blocks 81*a* and 81*b* is made of a metal having a high thermal conductivity and has a number of blades for radiation. Air blowers, for example, propeller fans 82*a* and 82*b* are provided for the radiating blocks 81*a* and 81*b*, respectively.

Radiating blocks 83*a* and 83*b* are arranged to the cover of the flux fume purifying apparatus 41 so as to be in contact therewith or in close vicinity thereto. It is desirable that the radiating blocks 83*a* and 83*b* cover the surface of the cover as much as possible. Each of the radiating blocks 83*a* and 83*b* is made of a metal having a high thermal conductivity and has a number of blades for radiation. Air blowers, for example, propeller fans 84*a* and 84*b* for blowing a wind are provided for the radiating blocks 83*a* and 83*b*, respectively. Since the inside of the flux fume purifying apparatus 41 is cooled by cooling the radiating blocks 81*a*, 81*b*, 83*a*, and 83*b* by the propeller fans 82*a*, 82*b*, 84*a*, and 84*b*, removing and collecting efficiencies of the flux can be raised.

Figure 15:
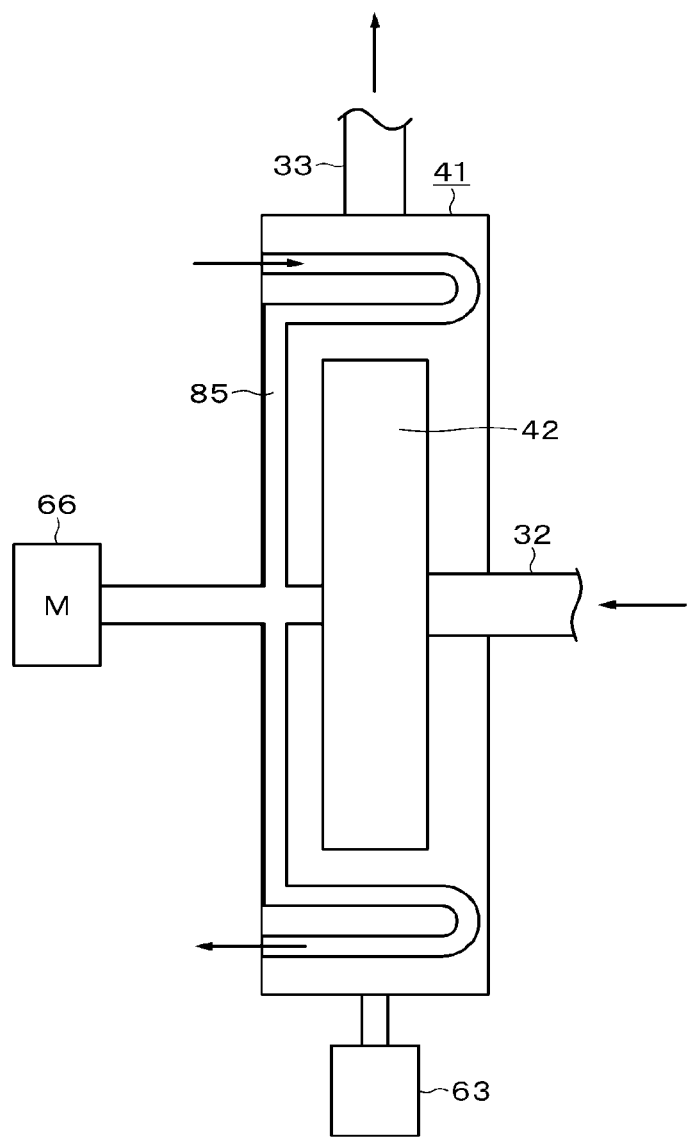
FIG. 15 is a schematic diagram for use in explanation of a fifth modification of the invention.

As illustrated in FIG. 15, a pipe 85 is arranged in the flux fume purifying apparatus 41 and by circulating a coolant, for example, water into the pipe 85, the inside of the flux fume purifying apparatus 41 can be cooled. For example, the pipe 85 is arranged along the foregoing paths P1 to P3. Thus, the removing and collecting efficiencies of the flux can be raised. FIG. 15 illustrates an internal construction in which the path forming unit 43 is omitted.

Further, in the invention, by repeating the compressing and expanding processes in a predetermined cycle, the removing and collecting efficiencies of the flux can be raised.

[Measurement of Flux Collecting Effect]

Figure 16:
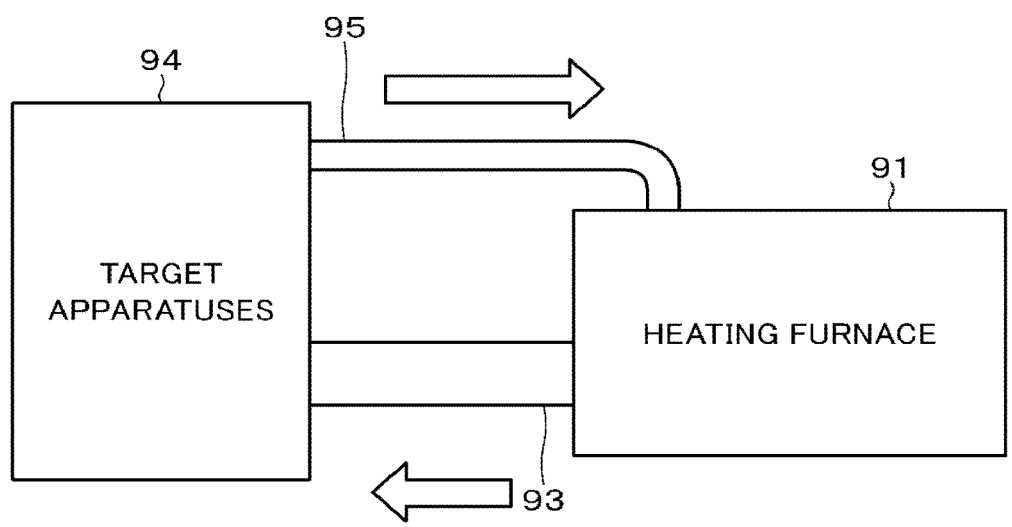
FIG. 16 is a block diagram for use in explanation of an experiment apparatus of the invention.

With respect to the foregoing construction of the present invention and the existing construction, flux collection ratios were measured. A construction of an experiment apparatus is shown in FIG. 16. As shown in FIG. 16, in a heating furnace 91, a generating source, for example, a solder paste of the flux fume is heated, thereby generating the flux fume. The flux fume is supplied to target apparatuses 94 through a piping 93. One of the target apparatuses 94 is the existing flux collecting apparatus for collecting the flux by a cooling system. Another one of the target apparatuses 94 is the flux fume purifying apparatus to which the invention was applied.

An amount of flux collected in the target apparatus 94 is measured and a flux collection ratio is obtained. The gas after the flux collection from the target apparatus 94 is returned to the heating furnace 91 through a piping 95. An example of a calculating method of the flux collection ratio is shown below.

Flux collection ratio (%)=weight (g) of flux collected by target apparatus/solder paste volatile weight (g)×100

Experiment results showing the collection ratios of the flux collecting apparatus according to the existing cooling system and the collection ratios of the flux fume purifying apparatus according to the invention are shown in Table 2. Experiment 1 is an experiment in the case where the existing apparatus according to the cooling system is used. Experiments 2, 3, and 4 are experiments in the case where the apparatus according to the invention is used and pressures are made different. A pressure Pa is a pressure in the collecting path 95.

TABLE 2

|  | Experiment 1 | Experiment 2 | Experiment 3 | Experiment 4 |
|---|---|---|---|---|
| Pressure [Pa] | — | 500 | 980 | 1200 |
| Collection ratio [%] | 28 | 51 | 70 | 75 |

In the existing flux collecting apparatus, the collection ratio is equal to 28%. According to flux fume purifying apparatus of the invention, the collection ratio can be improved to 51% (Experiment 2), 70% (Experiment 3), and 75% (Experiment 4), respectively. Further, by increasing the pressure Pa, the collection ratio can be raised.

3. Modifications

Although the embodiments of the invention have specifically been described above, the invention is not limited to the foregoing embodiments but various modifications based on the technical idea of the invention are possible. For example, the invention is not limited to the soldering apparatus such as a reflowing apparatus or the like but can be also applied to a mounting apparatus for adhering surface mounting parts onto a printed wiring board by a thermosetting adhesive agent, an apparatus for hardening a solder resist formed on a copper foil laminated plate which was pattern formed, or the like. In other words, the invention can be applied to a purification of a gas in which a substance vaporized by executing a heating process has been mixed into an atmosphere or inert gas.

The constructions, methods, steps, shapes, materials, numerical values, and the like mentioned in the foregoing embodiments are nothing but examples and constructions, methods, steps, shapes, materials, numerical values, and the like which are different from them may be used in accordance with necessity. The constructions, methods, steps, shapes, materials, numerical values, and the like mentioned in the foregoing embodiments can be mutually combined unless otherwise departing from the essence of the invention.

REFERENCE SIGNS LIST

11 . . . Inlet port, 12 . . . Exhaust port, 15 . . . Upper furnace 19 . . . heat accumulating member
31 . . . Carrying conveyer, 35 . . . Lower furnace,
41 . . . Flux fume purifying apparatus, 42 . . . Blades 42 of the turbo fan,
43 . . . Path forming unit, 45 . . . Bottom plate, 46, 48, 50 . . . Partition plate,
47 . . . Supply opening, 49, 51 . . . Exhaust port, P1 . . . First path,
P2 . . . Second path, P3 . . . Third part, 63 . . . Flux collecting vessel

The invention claimed is:

1. A conveying heating apparatus, comprising: a heating chamber for heating an object to be heated that allows the heated object to pass into the heating chamber by a conveying apparatus; and
a gas purifying apparatus to which a gas, in which an atmospheric gas or an inert gas and a substance vaporized by heating have been mixed, is supplied from the heating chamber,
wherein the gas purifying apparatus includes
a supply opening positioned at an outer periphery of blades of an air blower, the air blower being configured to blow the gas in which the atmospheric gas or the inert gas and the substance vaporized by heating have been mixed;
a path former into which the blown gas flows, and
a collecting vessel configured to collect a substance liquefied by the path former,
wherein the path former has a path of a cross-sectional area for compressing the blown gas, and a path of a larger cross-sectional area for expanding the compressed blown gas, and
wherein the path of the cross-sectional area and the path of the larger cross-sectional area are continuously formed in the path former.

2. The conveying heating apparatus according to claim 1, wherein the expanded compressed gas is returned into the heating chamber.

3. The conveying heating apparatus according to claim 2, wherein the expanded compressed gas is returned into the heating chamber through a separating apparatus.

4. The conveying heating apparatus according to claim 1, wherein the expanded compressed gas is exhausted as a factory exhaust gas through a separating apparatus.

5. The conveying heating apparatus according to claim 1, wherein the heating chamber is a furnace for performing a soldering by blowing the atmospheric gas or the inert gas to the object to be heated.

* * * * *